US011420633B2

(12) United States Patent
Garnault et al.

(10) Patent No.: US 11,420,633 B2
(45) Date of Patent: Aug. 23, 2022

(54) ASSISTING THE DRIVING OF AN AUTOMOTIVE VEHICLE WHEN APPROACHING A SPEED BREAKER

(71) Applicant: Valeo Schalter und Sensoren GmbH, Bietigheim-Bissingen (DE)

(72) Inventors: Alexandre Garnault, San Mateo, CA (US); Thomas Heitzmann, Bobigny (FR)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 196 days.

(21) Appl. No.: 16/755,687

(22) PCT Filed: Oct. 23, 2018

(86) PCT No.: PCT/EP2018/078988
§ 371 (c)(1),
(2) Date: Apr. 13, 2020

(87) PCT Pub. No.: WO2019/081481
PCT Pub. Date: May 2, 2019

(65) Prior Publication Data
US 2021/0197829 A1 Jul. 1, 2021

(30) Foreign Application Priority Data
Oct. 24, 2017 (FR) ........................ 1760031

(51) Int. Cl.
*B60W 40/06* (2012.01)
*B60W 40/04* (2006.01)

(52) U.S. Cl.
CPC ............ *B60W 40/06* (2013.01); *B60W 40/04* (2013.01); *B60W 2420/42* (2013.01);
(Continued)

(58) Field of Classification Search
CPC .. B60W 40/06; B60W 40/04; B60W 2556/40; B60W 2554/80; B60W 2552/50; B60W 2420/42
See application file for complete search history.

(56) References Cited

U.S. PATENT DOCUMENTS

2009/0164063 A1 6/2009 Piccinini et al.
2015/0088378 A1 3/2015 Sugai et al.
(Continued)

FOREIGN PATENT DOCUMENTS

DE 102011007608 A1 10/2012
DE 102015206473 A1 10/2016
(Continued)

OTHER PUBLICATIONS

International Search Report and Written Opinion in corresponding International Application No. PCT/EP2018/078988, dated Feb. 13, 2019 (12 pages).
(Continued)

*Primary Examiner* — Peter D Nolan
*Assistant Examiner* — Kenneth M Dunne
(74) *Attorney, Agent, or Firm* — Osha Bergman Watanabe & Burton LLP

(57) ABSTRACT

A driving assistance method for a motor vehicle (1) when approaching a speed bump comprises, according to the invention: detecting and tracking at least one other moving vehicle ($4_1$) in front of the motor vehicle (1) based on processing images captured by a camera (10) on board the motor vehicle (1); establishing a temporal profile of the estimated distance between the motor vehicle (1) and the at least one detected and followed other moving vehicle ($4_1$); detecting an anomaly area in the temporal profile; and estimating a distance $d_{bump}$ between the motor vehicle (1) and a speed bump (3) on the basis of the estimated distance
(Continued)

between the motor vehicle (1) and the at least one other vehicle ($4_1$) at a time separate from the times corresponding to the detected anomaly area.

9 Claims, 2 Drawing Sheets

(52) U.S. Cl.
CPC ..... *B60W 2552/50* (2020.02); *B60W 2554/80* (2020.02); *B60W 2556/40* (2020.02)

(56) References Cited

U.S. PATENT DOCUMENTS

| | | | | |
|---|---|---|---|---|
| 2017/0061710 | A1* | 3/2017 | Saeger | G01C 7/04 |
| 2017/0106855 | A1* | 4/2017 | Lavoie | B60W 40/06 |
| 2019/0027036 | A1 | 1/2019 | Mishina et al. | |
| 2019/0079539 | A1* | 3/2019 | Sridhar | G05D 1/0278 |
| 2019/0170511 | A1* | 6/2019 | Maucher | G01S 17/931 |
| 2019/0248364 | A1* | 8/2019 | Dastgir | B60W 10/20 |
| 2022/0063603 | A1* | 3/2022 | Kim | B60W 30/09 |

FOREIGN PATENT DOCUMENTS

| | | | | |
|---|---|---|---|---|
| DE | 102017201838 A1 | * | 8/2018 | ......... B60G 17/0165 |
| EP | 2886410 A1 | | 6/2015 | |
| GB | 2525839 A | * | 11/2015 | ......... B60G 17/0165 |
| KR | 0161177 B1 | * | 12/1998 | |
| KR | 20130000125 A | * | 1/2013 | |
| KR | 101517695 B1 | * | 5/2015 | |
| KR | 20160050736 A | | 5/2016 | |
| WO | 2013124320 A1 | | 8/2013 | |
| WO | 2013/145015 A1 | | 10/2013 | |
| WO | WO-2016045761 A | * | 3/2016 | ...... B60W 30/18018 |
| WO | 2017/126250 A1 | | 7/2017 | |

OTHER PUBLICATIONS

Notification of Reason for Rejection issued in Japanese Patent Application No. 2020-522967, dated Jul. 27, 2021 (7 pages).

* cited by examiner

ASSISTING THE DRIVING OF AN AUTOMOTIVE VEHICLE WHEN APPROACHING A SPEED BREAKER

The present invention relates in general to motor vehicles, and more precisely to a driving assistance method and system for a motor vehicle when approaching a speed bump.

Many driving assistance systems are nowadays provided for the purpose of improving traffic safety conditions.

Among the possible functionalities, mention may be made in particular of adaptive cruise control (ACC), automatically stopping and restarting the engine of the vehicle depending on the traffic conditions and/or signals (traffic lights, stop, give way, etc.), assistance for automatically keeping the trajectory of the vehicle in its driving lane, as proposed by lane keeping assistance systems, warning the driver about leaving a lane or unintentionally crossing lines (lane departure warning), lane change assistance or lane change control (LCC), etc.

Driving assistance systems thus have the general function of warning the driver about a situation requiring his attention and/or of defining the trajectory that the vehicle should follow in order to arrive at a given destination, and therefore to make it possible to control the units for controlling the steering and braking of the vehicle, so that this trajectory is effectively followed automatically. The trajectory should in this case be understood in terms of its mathematical definition, that is to say as being the set of successive positions that the vehicle has to occupy over time. Driving assistance systems thus have to define not only the route to be taken, but also the speed profile to be complied with. To this end, they use a large amount of information about the immediate surroundings of the vehicle (presence of obstacles such as pedestrians, cyclists or other motorized vehicles, signpost detection, road layout, etc.) originating from one or more detection means such as cameras, radars and lidars fitted on the vehicle, and also information linked to the vehicle itself, such as its speed, its acceleration and its position given for example by a GPS navigation system.

What are of interest hereinafter are specific situations in which a motor vehicle is approaching a speed bump situated on the road taken by the motor vehicle, and therefore has to sufficiently anticipate the presence of this speed bump in order to dynamically calculate the distance therefrom and trigger, if necessary, a deceleration procedure allowing the vehicle to travel over the speed bump at an appropriate speed.

For a partly automated or fully automated vehicle (said to be level 3 or higher using the classification given by the Society of Automotive Engineers (SAE)), there is provision to equip the vehicle with a high-definition geographical map that is supposed to give a precise location of speed bumps that are present on the road that is taken. However, one major problem concerns the ability of the vehicle to locate itself as precisely as possible on this map. Specifically, in the absence of precise self-location, the vehicle does not know how to estimate the distance between itself and a speed bump with sufficient precision. Some methods have been developed in order to correctly realign the position of a vehicle on an on-board geographical map using the detection of static markers situated on the road with the aid of various on-board sensors, and by correlating the detected markers with the markers present on the geographical map. In order to be able to apply these methods to the case of the speed bump, it would be necessary to be able to detect the presence of this speed bump from the motor vehicle. One possibility consists in detecting the presence of a dedicated signpost situated on the side of the road and warning of the presence of this speed bump. However, detection by processing images originating from a camera on board the vehicle remains difficult to achieve, particularly at night, and/or when the signposts are concealed by obstacles such as a truck or other vehicles situated on the road.

Motor vehicles with assisted driving, said to be level 2, for their part do not have a high-definition on-board geographical map.

Thus, in any case, there is a need to be able to estimate, on the basis of images captured by a camera on board a motor vehicle, the presence of a speed bump towards which the vehicle is heading, even in the event that signposts signaling the presence of this speed bump are obstructed, so as to dynamically derive a reliable measurement of the distance between the vehicle and this speed bump.

The aim of the present invention is to meet this need by proposing a driving assistance method and system for a motor vehicle when approaching a speed bump, using the detection of other vehicles performed on the basis of images captured by an on-board camera in order to deduce the presence of the speed bump and estimate the distance therefrom.

To this end, one subject of the invention is a driving assistance method for a motor vehicle when approaching a speed bump, comprising:
- a step of detecting and tracking at least one other moving vehicle in front of the motor vehicle based on processing images captured by a camera on board said motor vehicle;
- a step of establishing a temporal profile of the estimated distance between said motor vehicle and said at least one detected and followed other moving vehicle;
- a step of detecting an anomaly area in said temporal profile; and
- a step of estimating a distance $d_{bump}$ between said motor vehicle and a speed bump on the basis of a distance between the motor vehicle and said at least one other vehicle, estimated at a time $t_{bump}$ separate from the times corresponding to the detected anomaly area.

In addition to the main features that have just been mentioned, the method according to the invention may comprise one or more additional features from among the following features:
- the distance $d_{bump}$ is preferably estimated using the relationship $$d_{bump} = D(t_{bump}) - d_{parc}$$

wherein $D(t_{bump})$ is the distance between the motor vehicle and said at least one other vehicle estimated at said time $t_{bump}$, and $d_{parc}$ corresponds to the distance covered by the motor vehicle starting from said time $t_{bump}$.
- the detection and tracking step may comprise detecting and tracking at least one other vehicle traveling in the same direction as said motor vehicle; the time $t_{bump}$ is then preferably chosen before a time corresponding to the start of the detected anomaly area;
- the detection and tracking step may comprise detecting and tracking at least one other vehicle traveling in the opposite direction to said motor vehicle; the time $t_{bump}$ is then preferably chosen after a time corresponding to the end of the detected anomaly area;
- the method may furthermore comprise a step of correcting a position of said motor vehicle with respect to a high-definition geographical map on board said motor vehicle on the basis of a position of a marker corresponding to said speed bump and pre-recorded in said map, and of the estimated distance $d_{bump}$;

advantageously, the method may furthermore comprise a step of estimating an elevational movement of said motor vehicle, and said distance $d_{bump}$ is estimated only if no elevational movement greater than a predefined threshold and concomitant with a time corresponding to the detected anomaly area is estimated;

an elevational movement of said motor vehicle is estimated for example on the basis of an inertial sensor on board said motor vehicle;

as a variant, an elevational movement of said motor vehicle is estimated on the basis of analyzing optical flows over a plurality of successive image portions captured by said on-board camera.

Another subject of the invention is a driving assistance system for a motor vehicle when approaching a speed bump, comprising an on-board processing module able to implement the steps of the above method.

The invention will be better understood upon reading the following detailed description, given with reference to the appended figures, in which:

FIG. 1 schematically illustrates the principle of the invention on the basis of plan views (a) to (d) corresponding to four successive times of a situation of a motor vehicle approaching a speed bump;

Figure 1:
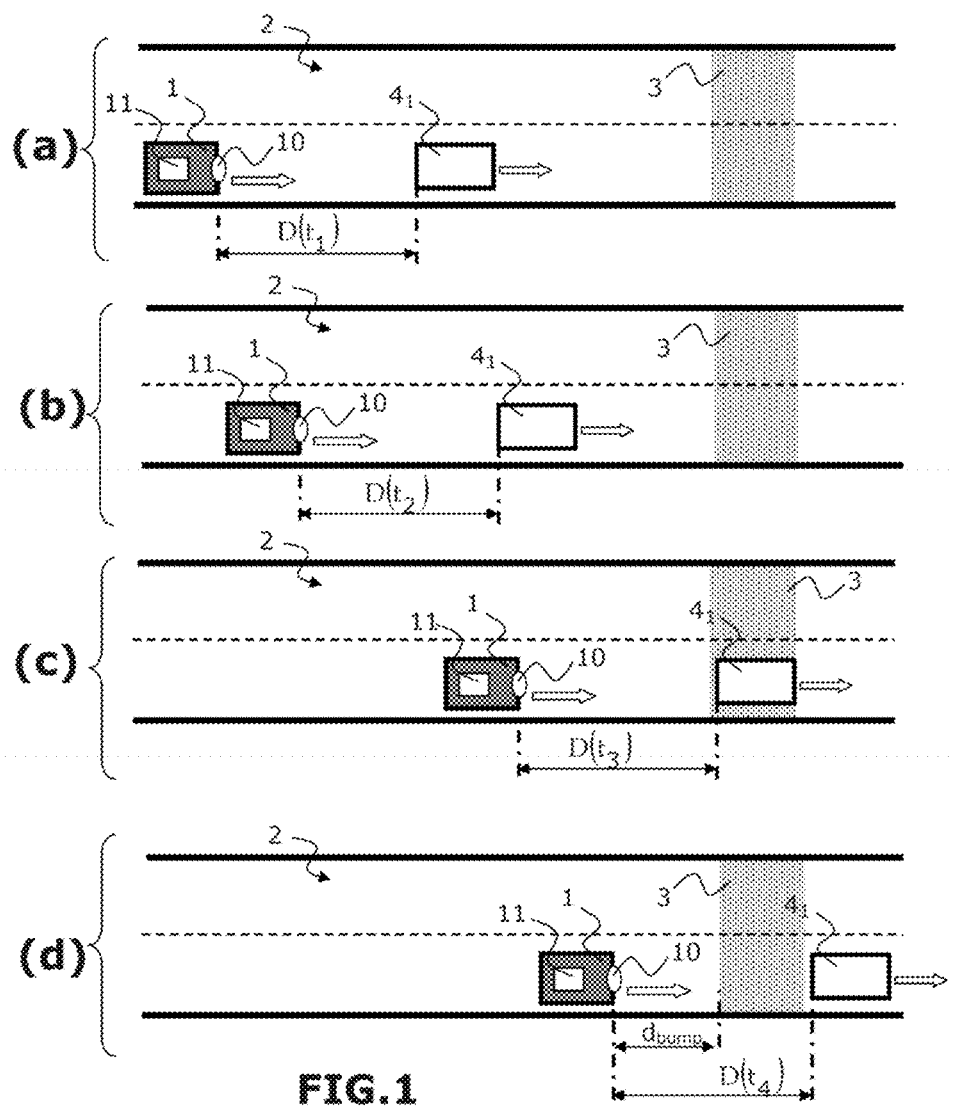

Hereinafter and with reference to FIG. 1, it is assumed by way of non-limiting example that a motor vehicle 1 is moving on a road 2 and is approaching a speed bump 3 situated on the road 2. In the road situation that is shown, another vehicle $4_1$, hereinafter called other vehicle, is moving on the road 2 in front of the motor vehicle 1, in the example in the same direction as the motor vehicle 1. In views (a) and (b) of FIG. 1 corresponding to two successive times $t_1$ and $t_2$, the two vehicles 1 and $4_1$ are situated before the speed bump 3. In the following view (c) corresponding to a time $t_3$, the other vehicle $4_1$ is currently driving over the speed bump 3. Lastly, view (d) corresponds to a time $t_4$ at which the other vehicle $4_1$ has already passed the speed bump 3, whereas the motor vehicle 1 is still before this speed bump.

The principle of the invention is based on the fact that it is possible for the motor vehicle 1, as will now be explained, to deduce the presence of the speed bump 3 and to dynamically estimate the distance $D_{BUMP}$ therefrom on the basis of the detection of the other vehicle $4_1$, performed through image processing.

To this end, the motor vehicle 1 is equipped with a camera 10 with known calibration parameters and able to capture successive images of scenery. The camera 10 is preferably located at a position in the vehicle that best corresponds to what the driver sees, for example centered in the windshield inside the passenger compartment. The motor vehicle 1 furthermore comprises a processing module 11 forming, with the camera 10, a system for detecting in particular the presence, ahead of the motor vehicle 1, of other vehicles, such as the other moving vehicle $4_1$. The front camera 10 thus captures the images of the road scene situated in front of the vehicle 1 and provides these images to the image processing module 11 of the system.

Figure 3:
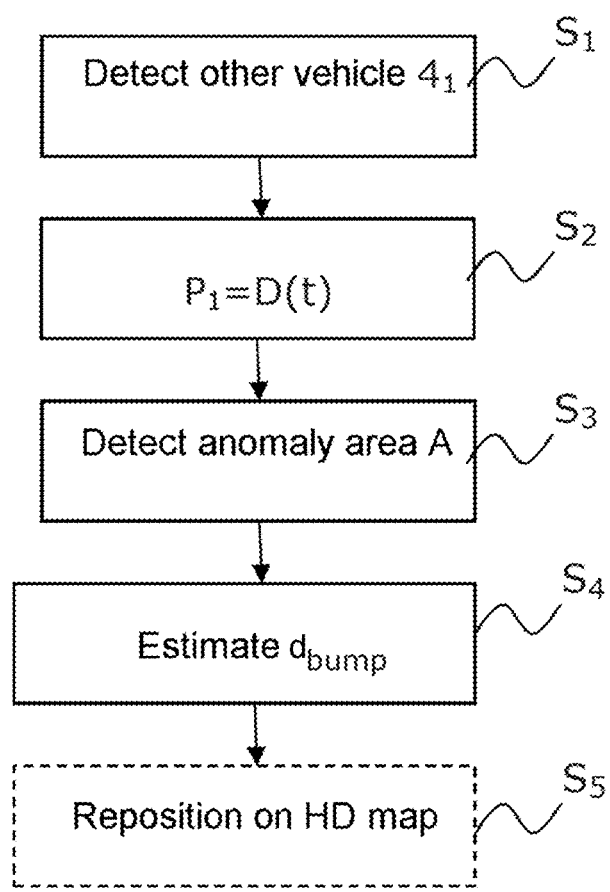
FIG. 3 shows a sequence of steps able to be implemented in a driving assistance system according to the invention.

For the road situation illustrated in FIG. 1, the image processing module 11 will be able to detect and track the other moving vehicle $4_1$ in a step referenced $S_1$ in FIG. 3.

In this respect, it is recalled that any other vehicle detected through image processing delivered by a single camera is generally delivered in the form of a surrounding box that defines an image area representative of the detected vehicle. This surrounding box has the general shape of a rectangle, in particular with a horizontal lower border or lower limit, and an upper horizontal border or upper limit. A 3D position of the detected obstacle is then estimated, generally using the lower limit of the corresponding surrounding box. The estimation is conventionally based on what is called the flat world scenario, in which the detected vehicles move only over a single horizontal plane, and use the intrinsic calibration parameters (focal length, pixel size) and extrinsic calibration parameters (line of sight angle with respect to the horizontal) of the camera 10 to estimate the distance D between the motor vehicle 1 and a detected vehicle on the basis of the vertical position of the lower limit of the associated surrounding box.

The module 11 will then conventionally have to establish (step $S_2$ in FIG. 3), for each detected and tracked other vehicle (in this case the other vehicle $4_1$ for the road situation in FIG. 1), a temporal profile of the distance D between the motor vehicle 1 and the other vehicle. In FIG. 1, $D(t_1)$ thus denotes the distance between the two vehicles 1 and $4_1$ in view (a), $D(t_2)$ denotes the distance between the two vehicles 1 and $4_1$ in view (b), $D(t_3)$ denotes the distance between the two vehicle 1 and $4_1$ in view (c), and $D(t_4)$ denotes the distance between the two vehicles 1 and $4_1$ in view (b).

Figure 2:
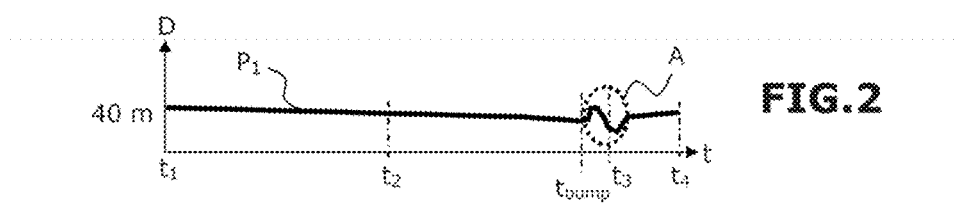
FIG. 2 shows a temporal profile of estimated distances between the motor vehicle and another detected vehicle in the situation illustrated in FIG. 1.

One example of a temporal profile $P_1$ of the distances between the motor vehicle 1 and the detected other vehicle $4_1$ in the specific road configuration of FIG. 1 is shown in FIG. 2.

It is observed that the profile $P_1$ contains a part in which the distance is substantially constant, reflecting the fact that the motor vehicle 1 and the detected other vehicle $4_1$ are traveling in the same direction, at substantially the same speed. The profile $P_1$ furthermore contains an anomaly area A around the time $t_3$ at which the other vehicle $4_1$ drives over the speed bump 3. This anomaly is linked to the flat world scenario used in the estimation of the distance between the motor vehicle 1 and the detected other vehicle $4_1$. Specifically, between the time at which the other vehicle $4_1$ begins to travel over the speed bump 3 and the time when the other vehicle $4_1$ leaves this speed bump 3, elevational differences of the other vehicle $4_1$ occur that are not taken into account in the conventional estimation of the distance between this other vehicle $4_1$ and the motor vehicle 1.

This anomaly is reflected in a rapid increase in the estimated distance, followed by a rapid decrease.

According to the invention, the module 11 will detect (step $S_3$ in FIG. 3) the anomaly area A in the temporal profile.

To this end, the module 11 may store the distances estimated for the other vehicle $4_1$ over a sliding window, for example of the order of 10 seconds, and then calculate statistical operators over the sliding window, such as the average and variance, which will increase and then decrease within a very short time corresponding to the anomaly area A.

As a variant, the anomaly area A may be detected using a machine learning approach by applying a support vector machine (SVM) algorithm using a learning base in which examples of signatures specific to the anomaly areas are stored.

In one preferred embodiment, it is ensured at the same time that a detected anomaly area actually corresponds to an elevational movement linked to the other vehicle $4_1$ and not to an elevational movement linked to the motor vehicle 1. To this end, there is advantageously provision that the module 11 implements a step (not shown) of estimating an elevational movement of the motor vehicle 1, and that said distance $d_{bump}$ is estimated only if no elevational movement greater than a predefined threshold and concomitant with the time corresponding to the detected anomaly area A is estimated.

The elevational movement of the motor vehicle 1 may for example be estimated on the basis of an inertial sensor on board the motor vehicle 1. As a variant, the elevational movement of the motor vehicle 1 is estimated on the basis of analyzing optical flows over a plurality of successive image portions captured by the on-board camera 10. In the latter case, it is considered that it is the motor vehicle 1 that undergoes an elevational movement when the various analyzed optical flows have the same variations.

Once the anomaly area A has been detected, it is then possible for the motor vehicle 1 firstly to conclude as to the presence of the speed bump 3 and secondly to dynamically estimate (step $S_4$ in FIG. 4) the distance $d_{bump}$ between the motor vehicle 1 and this speed bump 3 by using a distance between the motor vehicle 1 and the other vehicle $4_1$ estimated at a time $t_{bump}$ separate from the times corresponding to the detected anomaly area.

An estimation of the distance $d_{bump}$ between the motor vehicle 1 and the speed bump 3 may in particular be calculated using the following relationship:

$$d_{bump}=D(t_{bump})-d_{parc}$$

wherein:
$D(t_{bump})$ is the distance between the motor vehicle 1 and the other vehicle $4_1$ as estimated at the time $t_{bump}$, and $d_{parc}$ corresponds to the distance covered by the motor vehicle 1 starting from said time $t_{bump}$.

It is made possible to calculate the covered distance by saving the state of the vehicle 1 (in particular its longitudinal speed and its yaw speed) in the sliding window of 10 seconds, or by saving the data of the mileage counter of the motor vehicle 1.

In the case of the road situation in FIG. 1, in which the vehicles 1 and $4_1$ are traveling in the same direction, the time $t_{bump}$ is preferably chosen before a time corresponding to the start of the detected anomaly area A (see FIG. 2).

The invention is however also applicable if the detected other vehicle is traveling in the opposite direction to the motor vehicle 1. In this case, the time $t_{bump}$ is preferably chosen after a time corresponding to the end of the detected anomaly area A.

The method and the system according to the invention thus make it possible to detect the presence of a speed bump and to estimate the distance between the motor vehicle using only the detection of other vehicles present on the road, thereby making it possible to overcome problems linked to conditions of being unable to see a signpost that is supposed to warn of this speed bump.

If the motor vehicle 1 is furthermore a partly automated or fully automated vehicle, the method may advantageously comprise a step $S_5$ of correcting a position of the motor vehicle 1 with respect to an HD geographical map on board the motor vehicle 1 on the basis of a position of a marker corresponding to said speed bump 3 and pre-recorded in said map, and of the estimated distance $d_{bump}$.

The invention claimed is:

1. A driving assistance method for a motor vehicle when approaching a speed bump, comprising:
    detecting and tracking at least one other moving vehicle in front of the motor vehicle based on processing images captured by a camera on board said motor vehicle;
    establishing a temporal profile of the estimated distance between said motor vehicle and said at least one detected and followed other moving vehicle;
    detecting an anomaly area in said temporal profile; and
    estimating a distance $d_{bump}$ between said motor vehicle and a speed bump on the basis of a distance between the motor vehicle and said at least one other vehicle, estimated at a time $t_{bump}$ separate from the times corresponding to the detected anomaly area.

2. The method as claimed in claim 1, wherein the distance $d_{bump}$ is estimated using the relationship $$d_{bump}=D(t_{bump})-d_{parc}$$

wherein $D(t_{bump})$ is the distance between the motor vehicle and said at least one other vehicle estimated at said time $t_{bump}$, and $d_{parc}$ corresponds to the distance covered by the motor vehicle starting from said time $t_{bump}$.

3. The method as claimed in claim 2, wherein the detection and tracking step comprises detecting and tracking at least one other vehicle traveling in the same direction as said motor vehicle, and wherein said time $t_{bump}$ is chosen before a time corresponding to the start of the detected anomaly area.

4. The method as claimed in claim 2, wherein the detection and tracking step comprises detecting and tracking at least one other vehicle traveling in the opposite direction to said motor vehicle, and wherein said time $t_{bump}$ is chosen after a time corresponding to the end of the detected anomaly area.

5. The method as claimed in claim 1, further comprising: correcting a position of said motor vehicle with respect to a high-definition geographical map on board said motor vehicle on the basis of a position of a marker corresponding to said speed bump and pre-recorded in said map, and of the estimated distance $d_{bump}$.

6. The method as claimed in claim 5, wherein an elevational movement of said motor vehicle is estimated on the basis of an inertial sensor on board said motor vehicle.

7. The method as claimed in claim 5, wherein an elevational movement of said motor vehicle is estimated on the basis of analyzing optical flows over a plurality of successive image portions captured by said on-board camera.

8. The method as claimed in claim 1, further comprising: estimating an elevational movement of said motor vehicle, and wherein said distance $d_{bump}$ is estimated only if no elevational movement greater than a predefined threshold and concomitant with a time corresponding to the detected anomaly area is estimated.

9. A driving assistance system for a motor vehicle when approaching a speed bump, comprising an on-board processing module configured to perform the method as claimed in claim 1.

* * * * *